US012656822B2

(12) United States Patent
Pang et al.

(10) Patent No.: US 12,656,822 B2
(45) Date of Patent: Jun. 16, 2026

(54) ELECTRONIC DEVICE

(71) Applicant: Lenovo (Beijing) Limited, Beijing (CN)

(72) Inventors: Yanping Pang, Beijing (CN); Yingce Zheng, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/923,389

(22) Filed: Oct. 22, 2024

(65) Prior Publication Data

US 2025/0138586 A1 May 1, 2025

(30) Foreign Application Priority Data

Oct. 31, 2023 (CN) .......................... 202311433048.7

(51) Int. Cl.
*G06F 1/16* (2006.01)
*G06F 3/14* (2006.01)

(52) U.S. Cl.
CPC ............ *G06F 1/165* (2013.01); *G06F 1/1683* (2013.01); *G06F 3/1423* (2013.01)

(58) Field of Classification Search
CPC ....... G06F 1/165; G06F 1/1683; G06F 3/1423
See application file for complete search history.

(56) References Cited

U.S. PATENT DOCUMENTS

2021/0034103 A1* 2/2021 Shi ........................ G06F 1/1649

* cited by examiner

*Primary Examiner* — Insa Sadio

(74) *Attorney, Agent, or Firm* — ANOVA LAW GROUP, PLLC

(57) ABSTRACT

An electronic device includes a first display component and a second display component. The first display component and the second display component are arranged on different bodies of the electronic device. When the electronic device is switched from a first state and a second state, the first display component remains in a visible mode.

12 Claims, 6 Drawing Sheets

ELECTRONIC DEVICE

CROSS-REFERENCE TO RELATED APPLICATION

This application claims priority to Chinese Patent Application No. 202311433048.7, filed on Oct. 31, 2023, and the entire content of which is incorporated herein by reference.

TECHNICAL FIELD

The present disclosure relates to the technical field of device interconnection applications, and more particularly, to an electronic device.

BACKGROUND

The display screen of an existing laptop computer cannot present information to a user when the laptop computer is in a closed state, so the user must open the laptop computer to obtain the content of the information through the display screen, which complicates the operation of the laptop computer by the user and wastes the user's time.

SUMMARY

One aspect of the present disclosure provides an electronic device. The electronic device includes a first display component and a second display component. The first display component and the second display component are arranged on different bodies of the electronic device. When the electronic device is switched from a first state and a second state, the first display component remains in a visible mode.

Another aspect of the present disclosure provides an electronic device. The electronic device includes a first body; a second body; a first display component arranged on the first body; and an adaption space arranged on the second body to accommodate the first display component, such that when the electronic device is switched between a first state and a second state, the first display component passes through the adaption space to remain in a visible mode.

BRIEF DESCRIPTION OF THE DRAWINGS

The drawings are not necessarily drawn to scale. The same reference numerals in the drawings may describe similar parts in different views. The drawings generally illustrate examples of various embodiments rather than limitation. Together with the specification and claims, the drawings serve to illustrate the disclosed embodiments. When appropriate, the same reference numerals are used throughout the drawings to refer to the same or similar parts. The embodiments of the apparatus or method are illustrative and are not intended to be exhaustive or exclusive.

Figure 1:
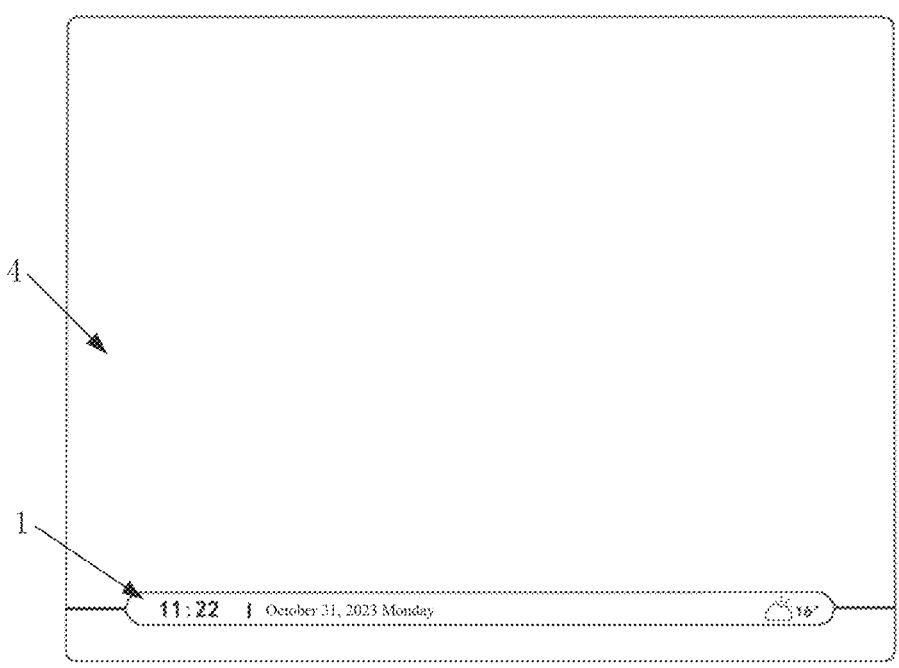
FIG. 1 is a top view of an electronic device in a first state according to some embodiments of the present disclosure.

The reference numerals in the drawings represent the following components: 1—first display component, 2—second display component, 3—first body, 4—second body, 5—shaft assembly, 6—transmission assembly, 7—shaft bracket, and 8—external device.

DETAILED DESCRIPTION OF THE EMBODIMENTS

To enable those skilled in the art to better understand the technical solution of the present disclosure, the present disclosure is described in detail below in conjunction with the drawings and specific implementation methods. The embodiments of the present disclosure are further described in detail below in conjunction with the drawings and specific implementation methods, but are not intended to limit the present application.

The terms "first", "second" and similar terms used in the present disclosure do not indicate any order, quantity or importance, but are only used to distinguish different parts. The terms "include" and "comprise" mean that the elements before the term include the elements listed after the term, and do not exclude the possibility of also including other elements. The terms "up", "down", "left", "right", and the like are only used to indicate relative positional relationships. When an absolute position of the described object changes, the relative positional relationship may also change accordingly.

In the present disclosure, when a specific device is described as being located between a first device and a second device, there may be an intermediate device between the specific device and the first device or the second device, or there may be no intermediate device. When a specific device is described as being connected to another device, the specific device may be directly connected to the other device without an intermediate device, or may not be directly connected to the other device but have an intermediate device.

All terms (including technical terms or scientific terms) used in this specification have the same meaning as understood by ordinary people skilled in the art to which this specification belongs, unless otherwise specifically defined. It should also be understood that terms defined in general dictionaries should be interpreted as having a meaning consistent with their meaning in the context of the relevant technology, and should not be interpreted in an idealized or extremely formal sense, unless explicitly defined herein.

The technologies, methods, and devices known to ordinary people skilled in the art may not be discussed in detail, but in appropriate cases, the technologies, methods and devices should be regarded as part of the specification.

The present disclosure provides an electronic device. The electronic device may refer to various electronic devices such as smart phones, tablet computers, laptop computers, etc. The present disclosure does not limit what kind of device the electronic device is, as long as the electronic device has a display function. The electronic device may include multiple bodies. For example, the electronic device may include a first body 3 and a second body 4. The first body 3 and the second body 4 are connected in a rotatable manner. The first body 3 can be constructed as a system end of the electronic device, and the second body 4 can be constructed as a display end of the electronic device.

Figure 2:
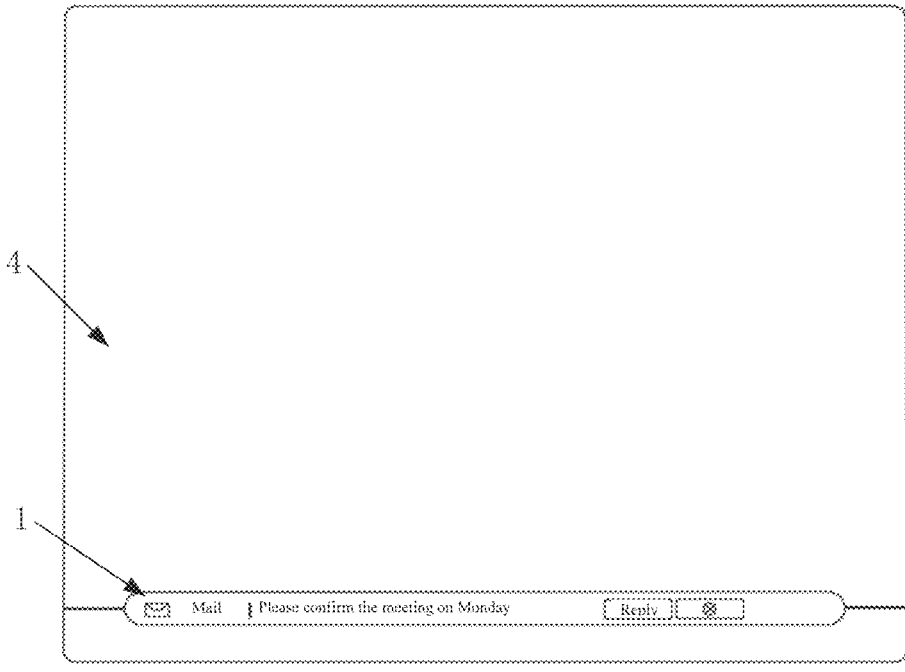
FIG. 2 is a top view of another electronic device in the first state according to some embodiments of the present disclosure.
Figure 3:
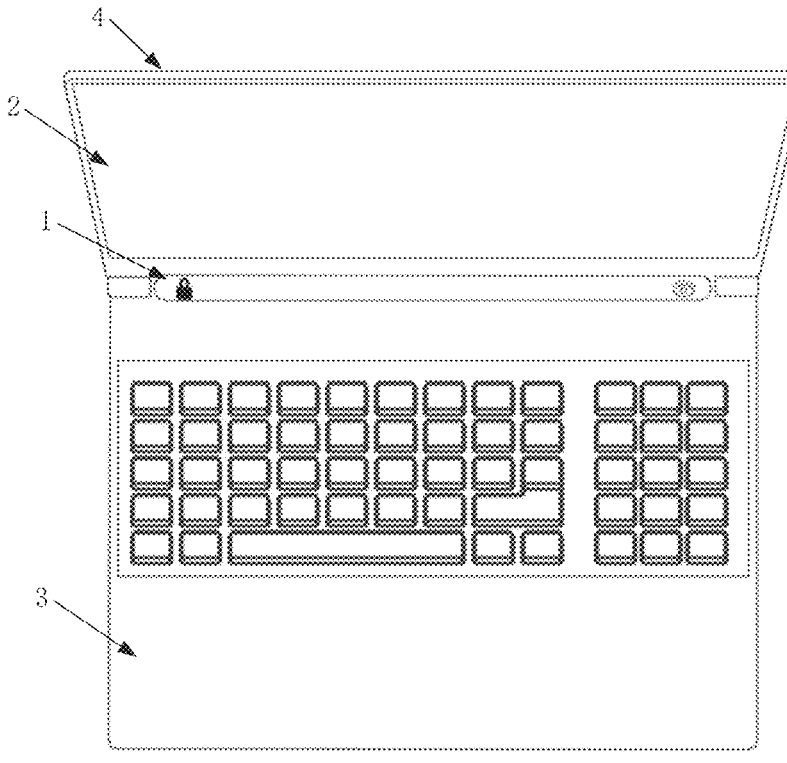
FIG. 3 is a top view of an electronic device in a second state according to some embodiments of the present disclosure.

As shown in FIGS. 1 to 3, the electronic device includes a first display component 1 and a second display component 2. The first display component 1 and the second display component 2 are arranged on different bodies of the electronic device. When the electronic device switches from a first state to a second state, the first display component 1 is in a visible mode.

In some embodiments, in the case where the electronic device includes a first body 3 and a second body 4, the first display component 1 and the second display component 2 are arranged on the first body 3 and the second body 4, respectively.

In some embodiments, the second display component 2 is in an invisible mode when the electronic device is in the first state, and in a visible mode when the electronic device is in the second state. That is, the difference between the first display component 1 and the second display component 2 is that the first display component 1 can be in the visible mode in both the first state and the second state, and the second display component 2 is in the invisible mode in the first state, and in the visible mode in the second state.

The electronic device shown in FIG. 1 and FIG. 2 is in the first state. When the electronic device is in the first state, the first body 3 and the second body 4 of the electronic device can be in a relatively closed state. That is, an angle between the first body 3 and the second body 4 is 0°, and the first display component 1 is in the visible mode. The electronic device shown in FIG. 3 is in the second state. When the electronic device is in the first state, the first body 3 and the second body 4 of the electronic device may be in a relatively open state. That is, the angle between the first body 3 and the second body 4 is greater than 0°, for example, between 0° and 180°, and the first display component 1 is in the visible mode.

In some embodiments, as shown in FIG. 1, when the electronic device is in the first state, the first display component 1 may display information related to time and weather.

In some embodiments, the visible mode may be understood as visibility in a non-display state when the electronic device is in a non-operating state. That is, a display screen of the display component can still be seen when the electronic device is not in operation. The visible mode may also be understood as a display state of the display component of the electronic device is always visible, and a user may view a display content on the display component when the display component is in the visible mode.

In some embodiments, the first display component 1 and the second display component 2 can be interactively controlled, and the user may control the second display component 2 through the first display component 1, and may also control the first display component 1 through the second display component 2.

In some embodiments, the first display component 1 may have a shape such as a long strip or may have an elliptical boundary, and may have a display area smaller than that of the second display component 2. When the electronic device is in the second state, the first display component 1 is used to assist the second display component 2 in displaying.

The present disclosure uses the first display component 1 and the second display component 2 disposed on different bodies of the electronic device, and the first display component 1 can be in the visible mode when the electronic device is in the first state and the second state, such that no matter whether the electronic device is in the first state or the second state, the first display component 1 in the visible mode can achieve an objective of having a display function. In particular, when the electronic device is in the first state, the user can decide whether to open the electronic device according to the display content of the first display component 1, thereby appropriately reducing user's operation of opening and closing the electronic device and improving user experience.

In some embodiments, the second display component 2 may respond to a trigger operation of the first display component 1 to control the display content of the second display component 2.

In this way, the user can control the display content of the second display component 2 by operating on the first display component 1, achieving an interactive control of the first display component 1 and the second display component 2, providing a variety of options for the user's operation, and increasing the convenience of operation.

In some embodiments, when the electronic device is in the first state, triggering the first display component 1 will generate a first control instruction, and the second display component 2 may respond to the first control instruction when the electronic device is in the second state to control the display content of the second display component 2 based on the first control instruction, such that the first display component 1 and the second display component 2 can display synchronously. In other words, when the electronic device is in a closed state, the first display component 1 may receive the trigger operation, and the second display component 2 may not receive the trigger operation. At this time, the second display component 2 may adjust the display content according to the trigger operation when the electronic device is switched to the open state.

In one example, when the electronic device is in the closed state, the user triggers the first display component 1 to turn off a wireless communication function of the electronic device. At this time, an icon of the wireless communication function on the first display component 1 will be displayed as disconnected. After the electronic device is switched to the open state, the icon of the wireless communication function displayed on the second display component 2 will also be synchronously displayed as disconnected.

In some embodiments, when the electronic device is in the second state, triggering the first display component 1 will generate a second control instruction, and the second display component 2 may adjust the display content based on the second control instruction in real time to achieve the objective of synchronous display of the first display component 1 and the second display component 2.

In another example, when the electronic device is in the open state, the first display component 1 may be triggered to generate the second control instruction to adjust part of the display content on the second display component 2 to be displayed by the first display component 1, and part of the display content on the second display component 2 may include list bar information, menu bar information, etc. For example, the list bar information displayed on the second display component 2 is adjusted to be displayed by the first display component 1. At this time, the second display component 2 will no longer display the list bar information, and the list bar information will be displayed by the first display component 1, thereby achieving adjustment of the display content presented by the first display component 1 and the second display component 2.

In another example, when the electronic device is in the open state, at least one quick operation function key may be presented on the first display component 1, and the quick operation function key may include at least one or more of the following: a Wi-Fi key, a screen projection key, a setting key, a flight mode key, a Bluetooth connection key, an unlock key, etc. After the quick operation function key is triggered, the display content corresponding to the quick operation function key may be presented on the second display component 2, such that the user can further adjust quick operation to be implemented through the second display component 2. For example, after the screen projection key is triggered on the first display component 1, because the display area of the first display component 1 is relatively limited, the second display component 2 may present a list of devices to be projected and a content box to be projected, such that the user can further control a screen projection function.

In another example, when the electronic device is in the open state, at least one function program icon may be presented on the first display component 1, and the at least one function program icon may include at least one or more of the following: a setting icon, a camera icon, a recording icon, etc. After the function program icon is triggered, the display content corresponding to the function program icon may be presented on the second display component 2, such that the user can further adjust the function operation to be implemented through the second display component 2. For example, after the camera icon is triggered on the first display component 1, because the display area of the first display component 1 is relatively limited, the second display component 2 can present a picture captured by the camera of the electronic device, as well as information such as icons corresponding to a gallery, such that the user can see more comprehensive information through the second display component 2.

In some embodiments, if the electronic device is in the second state, at least a part of the display content of the second display component 2 is presented on the first display component 1.

In this way, when the electronic device is in the second state, the part of the display content on the second display component 2 can be presented on the first display component 1, making full use of the display area of the first display component 1 to achieve the objective of changing a visual ratio of the second display component 2 and increasing the display area of the second display component 2.

In some embodiments, at least a part of the display content adjusted from the second display component 2 to the first display component 1 may be related to the trigger operation. For example, a first trigger operation may cause a first display content of the second display component 2 to be presented on the first display component 1, and a second trigger operation may cause a second display content of the second display component 2 to be presented on the first display component 1. In other words, the display content to be adjusted changes with the change of the trigger operation.

In some embodiment, when the electronic device is in the second state, the user may trigger the first display component 1 or the second display component 2, or may trigger both the first display component 1 and the second display component 2 at the same time. That is, the user may present at least a part of the display content of the second display component 2 on the first display component 1 through a variety of methods.

In one example, when the electronic device is in an open state, the user may trigger the first display component 1, specifically by triggering an icon on the first display component 1, or by triggering a gesture of the first display component 1 to achieve control, such as a double-click operation gesture, a two-finger sliding gesture, etc. After triggering the first display component 1, a part of the display content of the second display component 2 will be adjusted to the first display component 1 for display, and the second display component 2 will no longer display the part of the display content.

In one example, when the electronic device is in the closed state, the user may trigger the second display component 2, specifically by triggering an icon on the second display component 2, or by triggering a gesture of the second display component 2 to achieve control.

In some embodiments, if the electronic device is in the first state, the first display component 1 displays information received by the electronic device, or, if the electronic device is in the first state, the first display component 1 displays the information received by the electronic device and receives the trigger operation on the information.

In this way, when the electronic device is in the first state, the first display component 1 can display the information received by the electronic device in real time, and the user can see the received information without opening the electronic device, which facilitates the user to judge whether to open the electronic device according to the information on the first display component 1, and increases the convenience of user operation.

In some embodiments, the information received by the electronic device may include at least one or more of the following: information sent by an external device 8 connected to the electronic device for communication, and information related to the state of the electronic device itself. The information sent by the external device 8 connected to the electronic device for communication may include at least email information, instant messaging information, etc.

In some embodiments, the first display component 1 may display brief information corresponding to the information received by the electronic device, to prompt the user concisely and clearly through the brief information.

In some embodiments, after the first display component 1 displays the information received by the electronic device, the user may choose whether to trigger the information through the first display component 1 according to their own needs, and the trigger operation may include a reply operation and a close operation. For example, as shown in FIG. 2, in addition to presenting the received information "Please confirm the meeting on Monday" on the first display component 1, there will also be a "reply" icon and a "close" icon (i.e., the icon marked with an x symbol in the drawing). After the user clicks the "reply" icon, the received information can be replied to through the first display component 1. When the user clicks the "close" icon, the received information can be closed such that it is no longer displayed on the first display component 1. At this time, the electronic device is always in the first state, such that the user can perform corresponding operations on the received information without turning on the electronic device.

In some embodiments, after the first display component 1 displays the information received by the electronic device, due to the limited display area of the first display component 1, there may be a problem that the first display component 1 is difficult to display all the received information. In this case, the first display component 1 may support sliding touch to slide and display all the information received by the electronic device, such that the user can obtain more comprehensive information through the first display component 1.

In some embodiments, the first display component 1 displays a function button, which is used to generate a third control instruction after being triggered, and the first display component 1 is used to respond to the third control instruction to present the display content based on the third control instruction.

In some embodiments, the function button includes at least one or more of the following: a Wi-Fi button, a screen projection button, a setting button, a flight mode button, a Bluetooth connection button, and an unlock button.

In some embodiments, the function button includes at least the unlock button. The electronic device is in the first state. In response to the unlock operation, the electronic device is changed to the second state, and the second display component 2 is directly switched to the unlock state.

In this way, when the electronic device is in the closed state, it may be unlocked through the first display component 1. When the electronic device is switched to the open state, the second display component 2 may be directly synchronized to an unlocked state without other operations, which not only ensures safety of the user using the electronic device, but also simplifies user operation through the interactive control between the first display component 1 and the second display component 2, further improving the convenience of operation.

In some embodiments, the first display component 1 and the second display component 2 may both have an unlocked state and a locked state. The unlocked state and the locked state of the first display component 1 and the second display component 2 may be synchronized. That is, after the first display component 1 is switched to the unlocked state, the second display component 2 may be synchronously switched to the unlocked state in the visible mode. After the second display component 2 is switched to the unlocked state, the first display component 1 may be synchronously switched to the unlocked state in real time.

In some embodiments, icons corresponding to the locked state and the unlocked state may be presented on the first display component 1, to prompt the user through the icon that the first display component 1 is in the unlocked state or the locked state. For example, as shown in FIG. 3, the icon corresponding to the locked state indicates that the first display component 1 is in the locked state.

Figure 4:
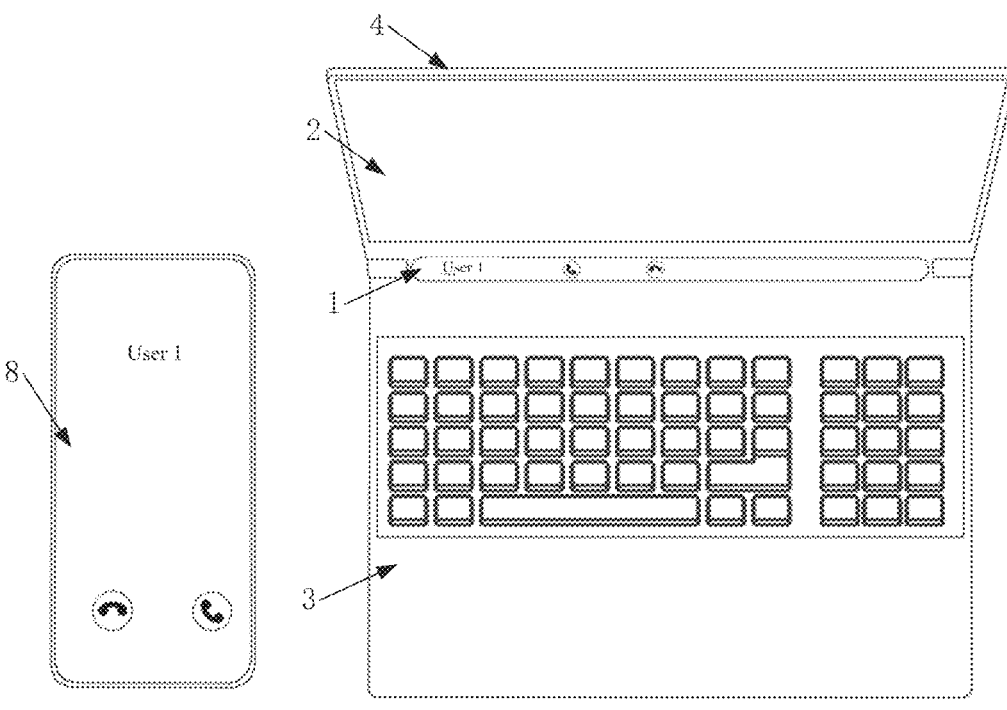
FIG. 4 is a schematic diagram of an exemplary connection between an electronic device in the second state and an external device according to some embodiments of the present disclosure.
Figure 5:
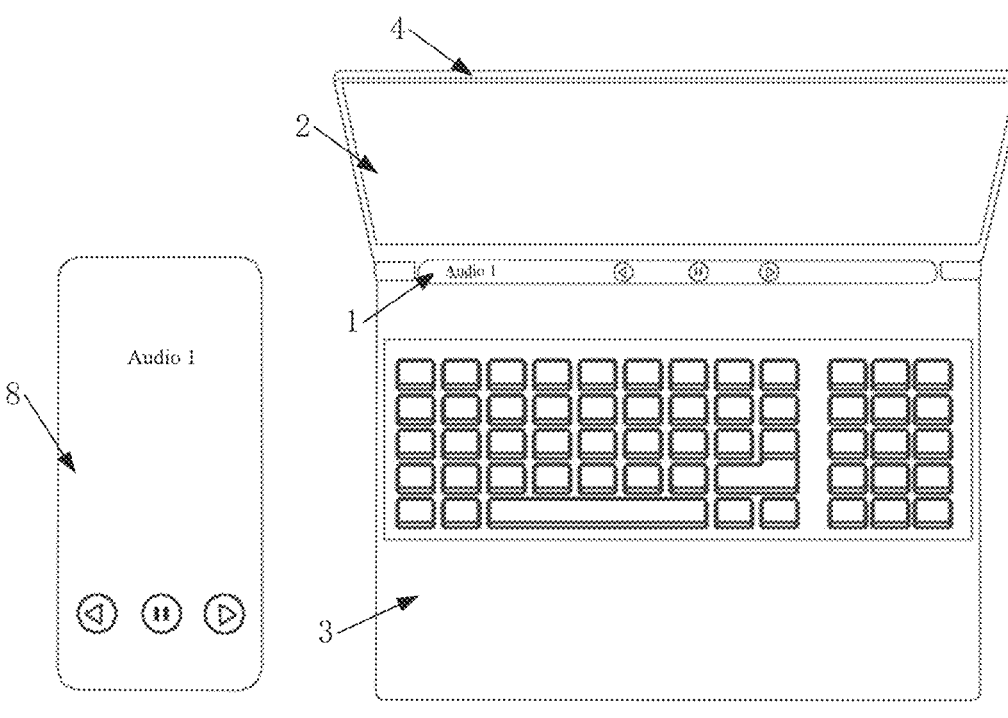
FIG. 5 is a schematic diagram of another exemplary connection between an electronic device in the second state and an external device according to some embodiments of the present disclosure.
Figure 6:
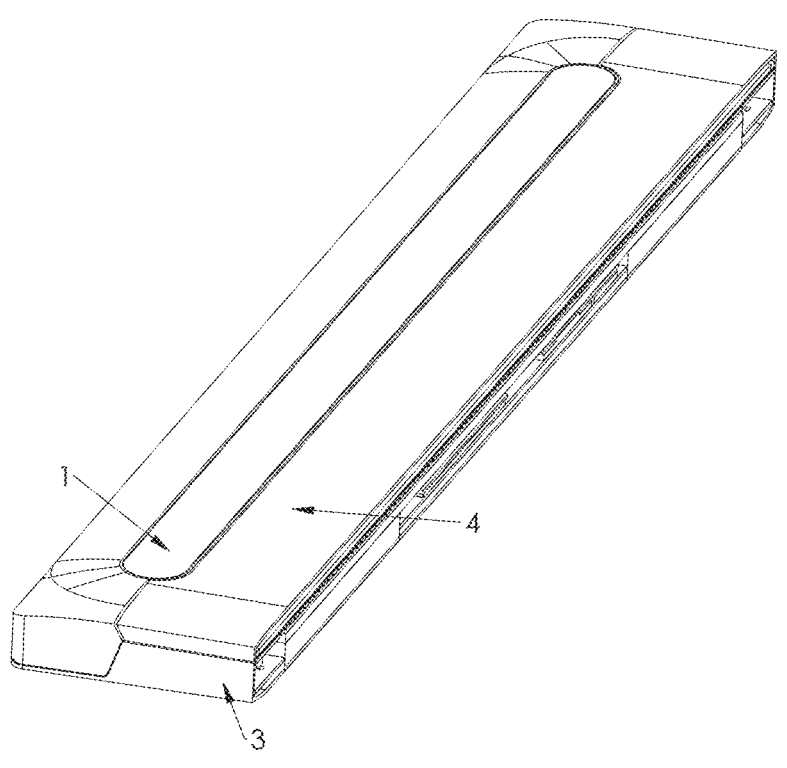
FIG. 6 is a schematic diagram of a three-dimensional structure of an electronic device in the first state according to some embodiments of the present disclosure.
Figure 7:
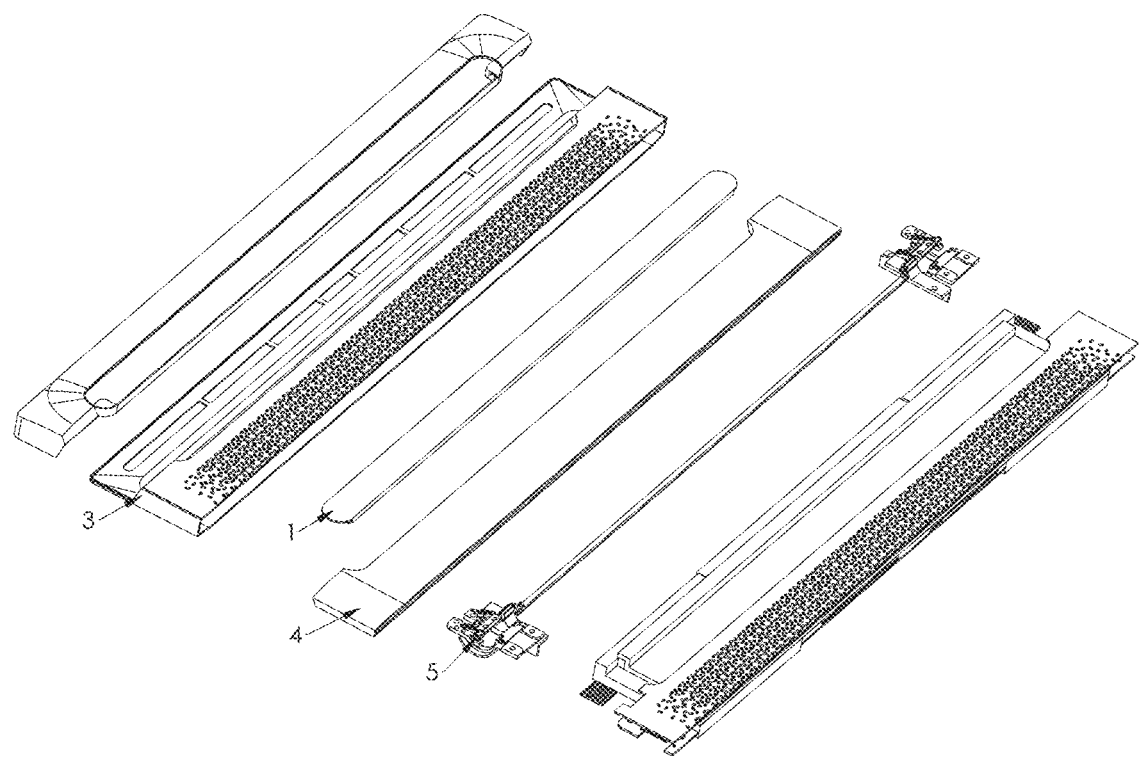
FIG. 7 is an exploded view of an electronic device according to some embodiments of the present disclosure.
Figure 8:
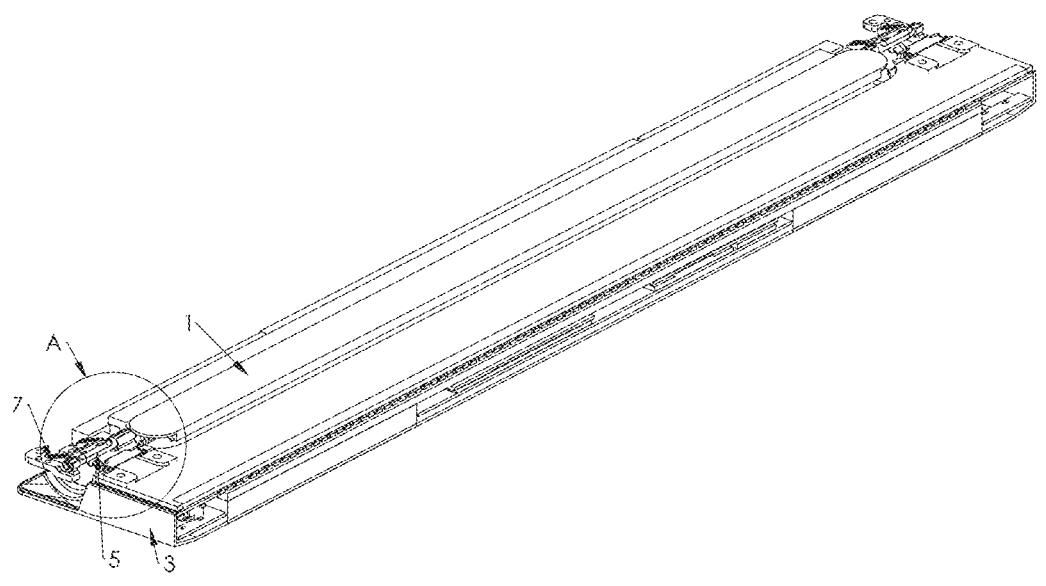
FIG. 8 is a partial structural diagram of an electronic device in the first state according to some embodiments of the present disclosure.
Figure 9:
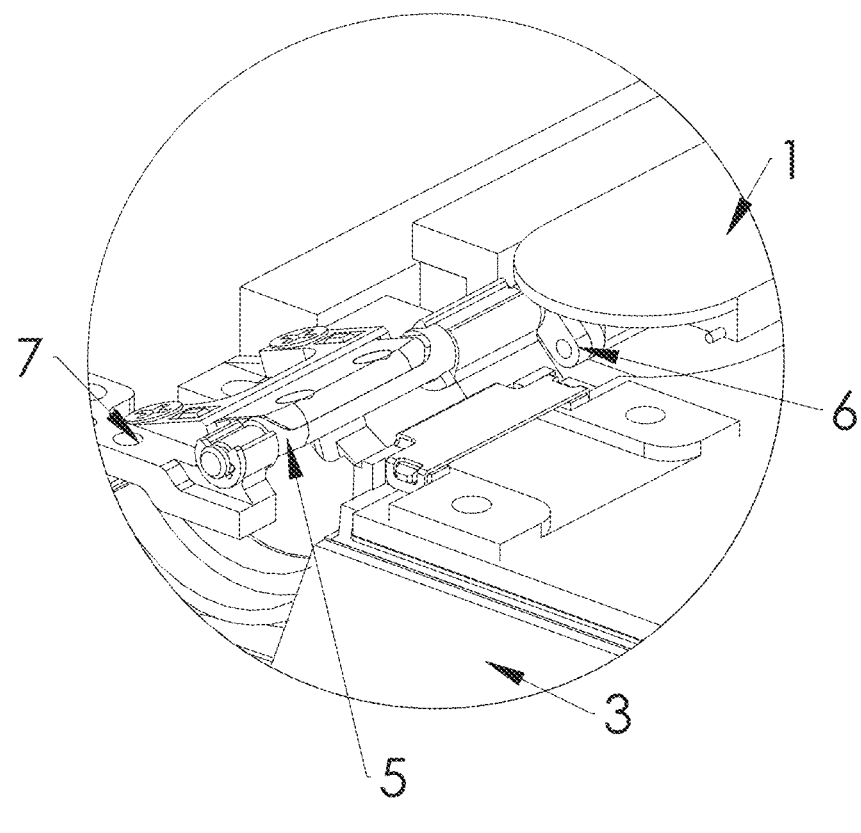
FIG. 9 is enlarged view of part A in FIG. 3.

In some embodiments, as shown in FIG. 4 and FIG. 5, the electronic device is connected to the external device 8 for communication, and the display content presented by the first display component 1 includes at least information related to the connection between the electronic device and the external device 8.

In this way, when the electronic device and the external device 8 are connected, a relevant content may be presented through the first display component 1, and the user may manipulate the first display component 1 to control the communication connection between the electronic device and the external device 8.

In some embodiments, the external device 8 may include one or more of the following devices: a smart phone, a projection device, and a tablet computer.

In one example, when the external device 8 includes the projection device, the user may trigger the first display component 1 to generate a fourth control instruction, and project the display content presented on the electronic device onto the projection device based on the fourth control instruction to achieve a one-key screen projection function. Among them, the display content of the first display component 1 may include at least information such as a device name corresponding to the projection device, a connection status of the electronic device and the projection device, etc.

In one example, when the external device 8 includes the smart phone, the display content of the first display component 1 may include at least information received by the smart phone, such as notifications of calls, text messages, and an application software received by the smart phone. For example, as shown in FIG. 4, after the smartphone receives a call, the first display component 1 may synchronously display a content corresponding to the received call, such as caller information, an answer call button, and a hang up call button. After the answer call button is triggered on the first display component 1, the call may be answered through the electronic device, and after the hang up call button is triggered on the first display component 1, the call may be hung up, to control the smart phone through a connection between the first display component 1 of the electronic device and the smart phone. In this way, regardless of whether the electronic device is in the open state or the closed state, information related to the smart phone may be obtained through the first display component 1, which increases the convenience of using the electronic device and improves the user experience.

In one example, in the case where the external device 8 includes the smart phone, the display content of the first display component 1 may at least include information presented by the smart phone, for example, presenting content related to an application running on the smart phone. For example, as shown in FIG. 5, an audio playback application is running on the smart phone connected to the electronic device, and the first display component 1 may present a volume control button, an audio playback button, and an audio switching button light, such that a playback content of the smart phone can be controlled by triggering a corresponding button on the first display component 1, providing convenience for the user.

The embodiment of the present disclosure also provides an electronic device. The electronic device may refer to different electronic devices such as smart phones, tablet computers, and laptop computers. The present disclosure does not limit what kind of electronic device is, as long as the electronic device has a display function.

As shown in FIGS. 6 to 12, the electronic device includes the first body 3 and the second body 4 that are rotatably connected. The first body 3 may be configured as the system end of the electronic device, and the second body 4 may be configured as the display end of the electronic device. The electronic device also includes the first display component 1. The first display component 1 is arranged on the first body 3, and the second body 4 has an adaptation space for accommodating the first display component 1, such that when the electronic device switches between the first state and the second state, the first display component 1 can pass through the adaptation space and remains in the visible mode in both the first state and the second state.

In some embodiments, the electronic device may also include the second display component 2 arranged on the second body 4. The second display component 2 is in the invisible mode when the electronic device is in the first state, and in the visible mode when the electronic device is in the second state. That is, the difference between the first display component 1 and the second display component 2 is that the first display component 1 can be in the visible mode when the electronic device is in both the first state and the second state, and the second display component 2 can be in the invisible mode when the electronic device is in the first state, and in the visible mode when the electronic device is in the second state.

Figure 10:
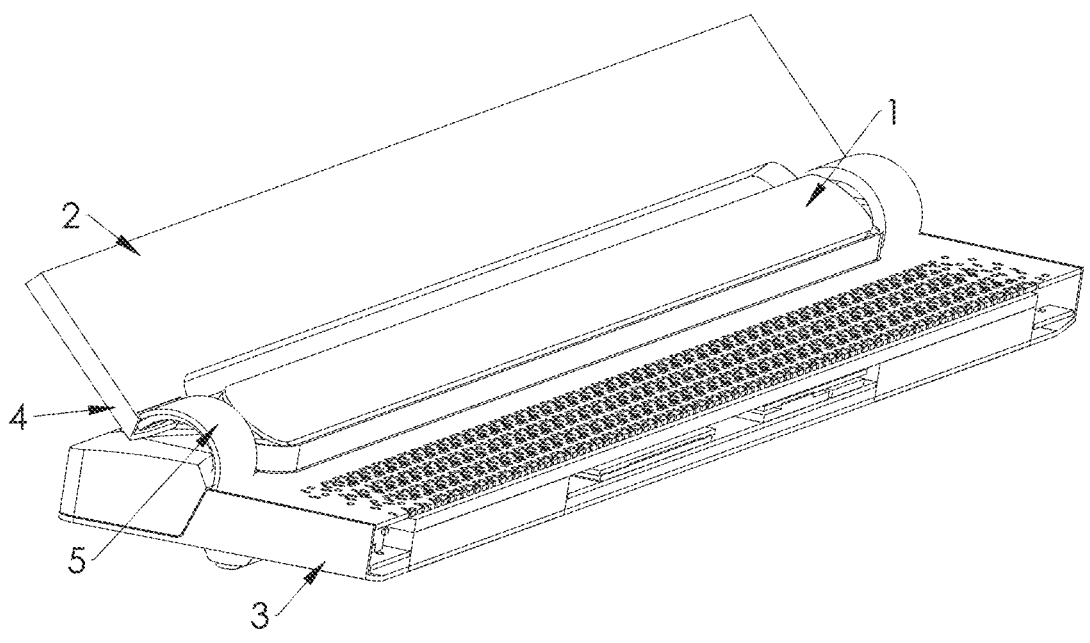
FIG. 10 is schematic diagram of a three-dimensional structure of an electronic device in the second state according to some embodiments of the present disclosure.
Figure 11:
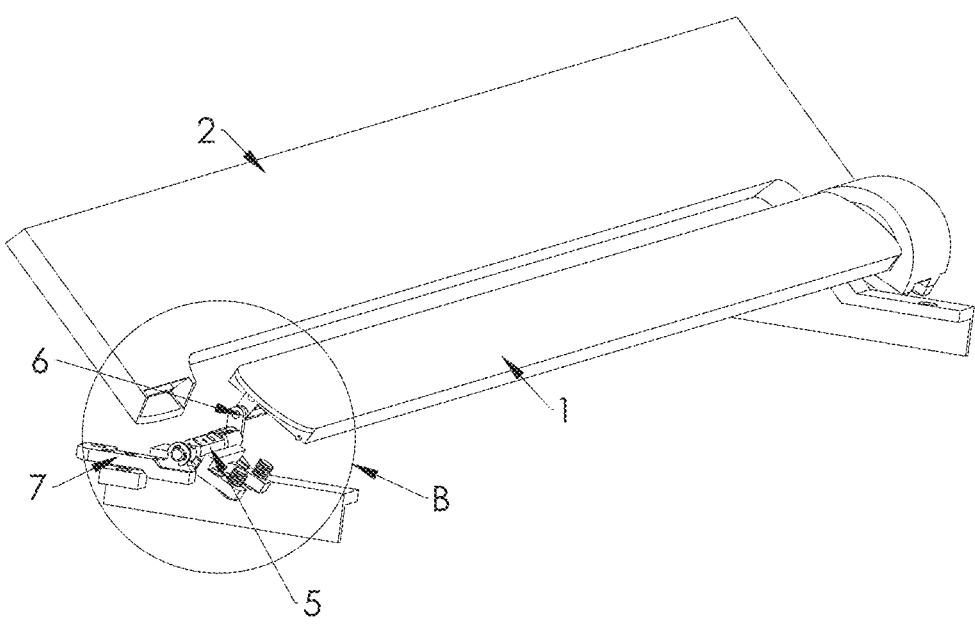
FIG. 11 is a partial structural diagram of an electronic device in the second state according to some embodiments of the present disclosure.
Figure 12:
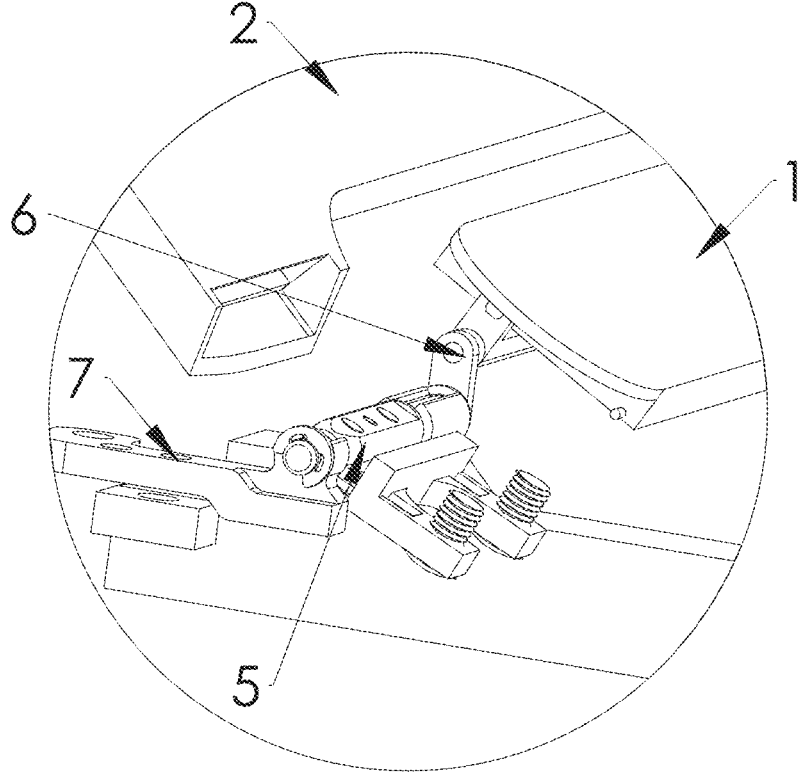
FIG. 12 is enlarged view of part B in FIG. 6.

The electronic device shown in FIGS. 6 to 9 is in the first state. When the electronic device is in the first state, the first body 3 and the second body 4 of the electronic device may be in the relatively closed state. That is, the angle between the first body 3 and the second body 4 is 0°, and the first display component 1 is in the visible mode. The electronic device shown in FIGS. 10 to 12 is in the second state. When the electronic device is in the first state, the first body 3 and the second body 4 of the electronic device may be in the relatively open state. That is, the angle between the first body 3 and the second body 4 is greater than 0°, for example, between 0° and 180°, and the first display component 1 is in the visible mode.

In some embodiments, the visible mode may be understood as the visibility in the non-display state when the electronic device is in the non-operating state. That is, the display screen of the display component may still be seen when the electronic device is not in operation. The visible mode may also be understood as the display state of the display component of the electronic device is always visible, and the user may view the display content on the display component through the display component in the visible mode.

In some embodiments, the first display component 1 and the second display component 2 may be interactively controlled, and the user may control the second display component 2 through the first display component 1, and may also control the first display component 1 through the second display component 2.

In some embodiments, the first display component 1 may have a shape such as a long strip, and its display area may be smaller than that of the second display component 2. When the electronic device is in the second state, the first display component 1 is used to assist the second display component 2 in displaying.

The present disclosure enables the first display component 1 to be in the visible mode when the electronic device is in the first state and the second state through the adaptation space on the second body 4, such that the first display component 1 in the visible mode can achieve the objective of having the display function regardless of whether the electronic device is in the first state or the second state. In particular, when the electronic device is in the first state, the user may decide whether to open the electronic device according to the display content of the first display component 1, thereby appropriately reducing the user's operation of opening and closing the electronic device and improving the user experience.

In some embodiments, as shown in FIGS. 7 to 12, the electronic device also includes a shaft assembly 5, the first body 3 is rotatably connected to the second body 4 through the shaft assembly 5, and the first display component 1 is transmission-connected to the shaft assembly 5, such that the first display component 1 rotates relative to the first body 3 as the shaft assembly 5 rotates.

In this way, the first display component 1 may be driven and connected with the rotating shaft assembly 5, such that the first display component 1 can rotate as the electronic device is turned on. Thus, the first display component 1 matches with a user's eyesight after rotation, providing the user with a better interactive perspective and better user experience.

In some embodiments, the rotation of the first display component 1 may not only include rotation relative to the first body 3, but also include a lifting movement of one end of the first display component 1 relative to the first body 3 and a descending movement of the other end relative to the first body 3. The present disclosure does not specifically limit the rotation of the first display component 1, and may achieve the objective of adjusting a display angle of the first display component 1 such that the first display component 1 can match the user's eyesight.

In some embodiments, a rotation angle of the first display component 1 and a rotation angle of the second display component 2 may be the same or different. For example, the rotation angle of the first display component 1 is the same as the rotation angle of the second display component 2, to further achieve the objective of providing the user with the better interactive perspective.

In some embodiments, a rotation direction of the first display component 1 is the same as a rotation direction of the second display component 2.

In some embodiments, the second body 4 includes at least an enclosure, a limiting groove may be formed on the enclosure, and a limiting member extending into the limiting groove is provided on the first display component 1 to limit a rotation trajectory of the first display component 1.

In some embodiments, the limiting groove may be in an arc shape. The limiting member may be in a columnar shape.

In some embodiments, the shaft assembly 5 is respectively connected to at least the opposite ends of the first display component 1 in a transmission manner to smoothly drive the first display component 1 to rotate.

In some embodiments, the first display component 1 may be arranged close to the shaft assembly 5, and when the first display component 1 is in an elongated strip shape, the length direction of the first display component 1 is parallel to an axial direction of the shaft assembly 5.

In some embodiments, the electronic device may further include a transmission assembly 6, and the first display component 1 is transmission-connected to the shaft assembly 5 through the transmission assembly 6. The transmission assembly 6 may include a plurality of connecting rods connected end to end in sequence, one of the plurality of connecting rods is fixedly connected to the first display component 1, and another of the plurality of connecting rods is fixedly connected to the shaft assembly 5.

In some embodiments, as shown in FIGS. 8 to 12, the electronic device further includes a shaft bracket 7 provided on the first body 3. The shaft assembly 5 is rotatably provided on the shaft bracket 7. The shaft bracket 7 has a first stop surface. The shaft assembly 5 has a second stop surface that abuts against the first stop surface when the first display component 1 rotates to a preset angle.

In this way, the opening angle of the first body 3 and the second body 4 of the electronic device may be limited by the abutment of the first stop surface and the second stop surface, such that the first display component 1 and the second display component 2 cannot continue to rotate after rotating to the preset angle.

In some embodiments, the range of the preset angle may be 120° to 150°. Preferably, the preset angle is 135°.

In some embodiments, the first display component 1 is fixedly arranged on the first body 3, and an angle between a display plane of the first display component 1 and a plane where the first body 3 is located is at a first threshold.

In this way, the first display component 1 may be stably mounted on the first body 3, and the angle between the display plane of the first display component 1 and the plane where the first body 3 is located is always kept within a certain value.

In some embodiments, the first display component 1 may have a first enclosure, the first body 3 may have a second enclosure, and the first enclosure may be integrally formed with the second enclosure to ensure an assembly stability between the first display component 1 and the first body 3.

In some embodiments, as shown in FIGS. 6 to 12, the first display component 1 is arranged on the first body 3 in a manner that is lifted and/or rotated.

In this way, the first display component 1 can rotate and/or lift relative to the first body 3, such that the first display component 1 can match the user's eyesight, providing the user with the better interactive perspective and the better use experience.

In some embodiments, a trigger structure may be provided on the electronic device, and the user may drive the first display component 1 to rotate and/or lift by manipulating the trigger structure.

In addition, although exemplary embodiments have been described herein, the scope includes any and all embodiments based on the present disclosure with equivalent elements, modifications, omissions, combinations (e.g., various embodiments intersecting schemes), adaptations or changes. The elements in the claims will be interpreted broadly based on the language used in the claims, and are not limited to the examples described in this specification or during the implementation of the present disclosure, and the examples will be interpreted as non-exclusive.

The above description is intended to be illustrative rather than restrictive. For example, the above examples (or one or more technical solutions thereof) may be used in combination with each other. For example, other embodiments may be used by a person of ordinary skill in the art when reading the above description. In addition, in the above detailed description, various features may be grouped together to simplify the present disclosure. This should not be interpreted as an intention that a disclosed feature that is not claimed for protection is essential to any claim. On the contrary, the subject matter of the present disclosure may be less than all the features of a particular disclosed embodiment. Thus, the following claims are incorporated herein into the detailed description as examples or embodiments, wherein each claim is independently a separate embodiment, and it is considered that these embodiments can be combined with each other in various combinations or arrangements. The scope of the present disclosure should be determined with reference to the appended claims and the full scope of equivalent forms granted by these claims.

The above embodiments are only exemplary embodiments of the present disclosure and are not intended to limit the present disclosure. The protection scope of the present disclosure is defined by the claims. Those skilled in the art may make various modifications or equivalent substitutions to the present disclosure within the essence and protection scope of the present disclosure, and such modifications or equivalent substitutions shall also be deemed to fall within the protection scope of the present disclosure.

What is claimed is:

1. An electronic device, comprising:

a first body:

a second body;

a first display component on the first body; and a second display component on the second body;

wherein:

the electronic device has a first state and a second state, an angle between the first body and the second body is 0° when the electronic device is in the first state, and the angle between the first body and the second body is greater than 0° when the electronic device is in the second state; and the first display component is in a visible mode both when the electronic device is in the first state and when the electronic device is in the second state.

2. The electronic device according to claim 1, wherein:

the second display component responds to a trigger operation of the first display component to control a display content of the second display component.

3. The electronic device according to claim 1, wherein:

in response to the electronic device being in the second state, at least a part of the display content of the second display component is presented on the first display component.

4. The electronic device according to claim 1, wherein:

in response to the electronic device being in the first state, the first display component displays information received by the electronic device; or in response to the electronic device being in the first state, the first display component displays the information received by the electronic device and receives the trigger operation on the information.

5. The electronic device according to claim 1, wherein:

the electronic device is in the first state, and the first display component displays a function button at least including an unlock button; and in response to a trigger operation, the electronic device is switched to the second state, and the second display component is directly switched to an unlocked state.

6. An electronic device, comprising:

a first body;

a second body;

a first display component arranged on the first body; and an adaption space arranged on the second body to accommodate the first display component;

wherein:

the electronic device has a first state and a second state, an angle between the first body and the second body is 0° when the electronic device is in the first state, and the angle between the first body and the second body is greater than 0° when the electronic device is in the second state; and the first display component is configured to pass through the adaption space to remain in a visible mode when the electronic device switches between the first state and the second state and be in the visible mode both when the electronic device is in the first state and when the electronic device is in the second state.

7. The electronic device according to claim 6, further comprising:

a shaft assembly, through which the first body is rotatably connected to the second body, wherein the first display component is transmission-connected to the shaft assembly, such that the first display component rotates relative to the first body as the shaft assembly rotates.

8. The electronic device according to claim 7, further comprising:

a shaft bracket arranged on the first body, wherein the shaft assembly is rotatably arranged on the shaft bracket, the shaft bracket has a first stop surface, and the shaft assembly has a second stop surface that abuts against the first stop surface when the first display component rotates to a preset angle.

9. The electronic device according to claim 7, wherein:

the first display component is fixedly arranged on the first body; and an angle between a display plane of the first display component and a plane where the first body is located is at a first threshold.

10. The electronic device according to claim 7, wherein:

the first display component is arranged on the first body in a manner that is lifted and/or rotated.

11. The electronic device according to claim 1, wherein an orientation of the first display component remains unchanged when the electronic device is switched between the first state and the second state.

12. The electronic device according to claim 1, wherein the second display component is in an invisible mode when the electronic device is in the first state, and the second display component is in a visible mode when the electronic device is in the second state.

\* \* \* \* \*